(12) United States Patent
Kreuzer et al.

(10) Patent No.: US 9,007,994 B2
(45) Date of Patent: Apr. 14, 2015

(54) RACH PROCEDURES AND POWER LEVEL FOR MTC DEVICES

(75) Inventors: Werner Kreuzer, Baiern (DE); David Phillip Hole, Southampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 497 days.

(21) Appl. No.: 13/331,808

(22) Filed: Dec. 20, 2011

(65) Prior Publication Data

US 2012/0155310 A1 Jun. 21, 2012

(30) Foreign Application Priority Data

Dec. 21, 2010 (EP) ..................................... 10196352

(51) Int. Cl.
| | |
|---|---|
| H04W 72/08 | (2009.01) |
| H04W 52/50 | (2009.01) |
| H04W 52/14 | (2009.01) |
| H04W 52/22 | (2009.01) |
| H04W 52/24 | (2009.01) |
| H04W 52/26 | (2009.01) |
| H04W 56/00 | (2009.01) |

(52) U.S. Cl.
CPC ............ *H04W 52/50* (2013.01); *H04W 52/146* (2013.01); *H04W 52/228* (2013.01); *H04W 52/245* (2013.01); *H04W 52/262* (2013.01); *H04W 56/0045* (2013.01)

(58) Field of Classification Search
None
See application file for complete search history.

(56) References Cited

U.S. PATENT DOCUMENTS

| | | | |
|---|---|---|---|
| 5,564,075 A | 10/1996 | Gourgue | |
| 6,115,390 A | 9/2000 | Chuah | |
| 6,721,281 B1 * | 4/2004 | Dick et al. | ..................... 370/252 |
| 6,856,812 B1 | 2/2005 | Budka et al. | |

(Continued)

FOREIGN PATENT DOCUMENTS

| | | |
|---|---|---|
| EP | 0896492 | 2/1999 |
| EP | 1942584 | 7/2008 |

(Continued)

OTHER PUBLICATIONS

International Bureau, "International Preliminary Report of Patentability", issued in connection with PCT application No. PCT/CA2011/050785, mailed Jul. 4, 2013 (7 pages).

(Continued)

*Primary Examiner* — Alex Skripnikov
(74) *Attorney, Agent, or Firm* — Fish & Richardson P.C.

(57) ABSTRACT

The present document relates to a wireless device in a digital cellular telecommunications network. For example, the present document relates to the request of an access channel from a wireless device to a base station of the digital cellular telecommunications network. Example methods for controlling one or more transmissions between a wireless device and a base station are described. The one or more transmissions include at least an initial transmission. One example method comprises determining the quality of a radio uplink between the wireless device and the base station, the quality being based on at least one parameter associated with a previous transmission; setting a control parameter for controlling the transmission between the wireless device and the base station based on the determined quality of the radio uplink; and transmitting the initial transmission.

24 Claims, 3 Drawing Sheets

(56) References Cited

U.S. PATENT DOCUMENTS

| | | | |
|---|---|---|---|
| 7,197,314 B2 * | 3/2007 | Soldani et al. | 455/450 |
| 7,295,855 B1 * | 11/2007 | Larsson et al. | 455/522 |
| 2003/0026324 A1 | 2/2003 | Li et al. | |
| 2003/0172160 A9 * | 9/2003 | Widegren et al. | 709/226 |
| 2005/0053099 A1 | 3/2005 | Spear et al. | |
| 2007/0177544 A1 | 8/2007 | Cui et al. | |
| 2009/0247180 A1 | 10/2009 | Higuchi et al. | |

FOREIGN PATENT DOCUMENTS

| | | |
|---|---|---|
| EP | 1991020 | 11/2008 |
| EP | 2104393 | 9/2009 |
| EP | 2367386 | 9/2011 |
| JP | 11-261623 | 9/1999 |
| JP | 2007-243310 | 9/2007 |
| JP | 2011-261623 | 11/2011 |
| KR | 100746017 | 8/2007 |
| WO | 0108322 | 2/2001 |
| WO | 2006068565 | 6/2006 |
| WO | 2007075559 | 7/2007 |
| WO | 2008066433 | 6/2008 |
| WO | 2008069555 | 6/2008 |
| WO | 2008085843 | 7/2008 |
| WO | 2009047971 | 4/2009 |
| WO | 2012083450 | 6/2012 |

OTHER PUBLICATIONS

International Searching Authority, International Search Report and Written Opinion issued in PCT/CA2011/050785, mailed on Mar. 6, 2012, 11 pages.
European Patent Office, Extended European Search Report issued in EP Application 10196352.8, 12 pages, dated Nov. 8, 2011.
Japan Patent Office, "Official Action," issued in connection with Application No. 2013-544986, Apr. 14, 2014, 5 pages.
Mexican Institute of Industrial Property, "Office Action," issued in connection with Application No. MX/a/2013/007210, received Jun. 2, 2014, 4 pages.
Japanese Patent Office, "Notice of Allowance," issued in connection with Application No. 2013-544986, Nov. 26, 2014, 3 pages.
Japanese Patent Office, "Official Action," issued in connection with Application No. 2013-544986, mailed Aug. 8, 2014, 8 pages.
IP Australia, "Patent Examination Report No. 1," issued in connection with Application No. 2011349036, Sep. 22, 2014, 3 pages.
Korean Intellectual Property Office, "Office Action," issued in connection with Application No. 10-2013-7019059, Jun. 27, 2014, 4 pages.
Mexican Patent Office, "Notice of Allowance," issued in connection with Application No. MX/a/2013/007210, Oct. 2, 2014, 1 pages.
IP Australia, "Notice of Acceptance," issued in connection with Application No. 2011349036, Nov. 20, 2014, 2 pages.
Canadian Intellectual Property Office, "Office Action," issued in connection with Application No. 2,822,368, Dec. 3, 2014, 4 pages.

* cited by examiner

RACH PROCEDURES AND POWER LEVEL
FOR MTC DEVICES

CROSS-REFERENCE TO RELATED
APPLICATION

This application claims the benefit of European patent application 10 196 352.8, filed 21 Dec. 2010, the entire content of which is expressly incorporated herein by reference.

TECHNICAL FIELD

The present document relates to mobiles stations in a digital cellular telecommunications network. In particular, the present document relates to the request of an access channel from a mobile station (MS) to a base station (BS) of the digital cellular telecommunications network.

BACKGROUND

In GERAN (GSM (global system for mobile communications) EDGE (enhanced data rates for GSM evolution) Radio Access Network), a random access channel (RACH) is used by the mobile station (MS) to request a channel from the network, e.g. in order to exchange information, to perform location updating or to start a connection. The RACH, which is a logical channel, is transported over the physical channel via access bursts. Typically, within a GERAN network at least one physical channel (which may be characterized by a time slot number and may be referred to as a timeslot) of a carrier frequency in the uplink direction (i.e. from the MS to the base transceiver station (BTS)) is attributed to the RACH. The corresponding channel on the downlink direction, i.e. from the BTS to the MS may be the Broadcast Control Channel (BCCH) which is used by the BTS to describe the identity, configuration and available features of the BTS to the MSs served by the BTS.

Currently, the output power used for the access burst sent over the RACH is set to the maximum available output power of the MS, in order to maximise the probability that the access burst reaches the appropriate BTS or base station (BS) of the network. The details regarding the implementation of the RACH and the structure of the access burst is provided in the technical specification 3GPP TS 45.008 which is incorporated by reference.

The above mentioned approach for selecting the output power has the effect that the MS uses full power, even when the MS is close to the BTS to which it tries to connect. This may result in unnecessarily high output power when an MS is close to the BS, thus causing additional interference on the radio interface, increasing the power consumption of the MS, and causing potential receiver issues in the base station (due to the very high received power level).

Machine type communication (MTC) devices, e.g. stationary devices such as smart meters, may be located relatively far from their serving base station (which may be the nearest base station of the telecommunications network, but which is not always the case). In addition to the geographic distance, the MTC devices may be placed at locations which are shielded from the radio network, e.g. in the basement of a building. As such, the "distance" of a device to the BS (from a radio link point of view) may be due to the geographical distance, as well as due to obstacles on the radio path between the device (MS) and the BS. As a result of such greater "distances", MTC devices may have the disadvantage of a lower received signal level for the RACH at the receiving base station compared to devices located relatively near to the same base station. This imbalance typically results in a lower probability for a successful channel access for stationary MTC devices.

The present document addresses these issues. In particular, the present document addresses the issue of balancing the probability of a successful channel access for different mobile stations which are served by a particular base station within a wireless telecommunications network such as GERAN.

SUMMARY

According to an aspect a method for controlling the transmission of an initial transmission (such as an access burst) on an uplink from a wireless device to a base station is described. The initial transmission may be a contention-based transmission, meaning that the initial transmission of a user equipment or wireless device may occur within the same time slot and/or the same physical channel (e.g. the common RACH) as an initial transmission of another user equipment. This means that multiple user equipments may simultaneously (or within the same time slot) transmit initial transmissions to the base station. An initial transmission may be characterized as a transmission which does not use resources exclusively assigned or allocated to the wireless device as part of an ongoing connection (such as a GPRS temporary block flow (TBF)). Multiple initial transmissions may be sent sequentially if, for example, no acknowledgement of a previous transmission is received, or if no connection is established (whether or not the initial transmission forms part of a procedure to request the establishment of such a connection).

The initial transmission may be a GERAN access burst used in a GERAN. Typically, a GERAN access burst is transmitted on a random access channel (RACH). The access burst may comprise a payload which comprises tail bits, synchronization sequence bits, and/or encrypted bits. The access burst may be shorter than a time slot of the underlying network, e.g. the GERAN. In this case, a guard period may be the difference of the length of the time slot and the length of the access burst. As such, the access burst may differ from a so called normal burst which has a length that corresponds to the length of the time slot. In case of GERAN, the wireless device may be a GERAN mobile station and/or the base station may be a GERAN base station.

The wireless device may be a stationary device, e.g. a smart metering device installed at a fixed location. Such stationary wireless devices may be installed at locations which provide a relatively low quality of a radio link from the wireless device to the base station. Consequently, such devices may have a reduced probability for a successful transmission of an access burst to the base station (i.e. a transmission that is received and correctly decoded by the base station). It should be noted that stationary devices may be devices that move very slowly and/or move within a confined area. A stationary device may be a device which maintains a timing advance (TA) for succeeding communication sessions within predetermined bounds. The predetermined bounds may correspond to the TA granularity of the underlying network. By way of example, in GSM the TA granularity is such that a movement of 100 m could still result in the same TA being used. As such, the wireless device may move at a speed lower than a speed threshold and/or the wireless device may move within an area smaller than an area threshold (e.g. a predetermined radius).

The method may comprise determining an indication of the quality of a radio link on the uplink from the wireless device to the base station. In particular, the method may comprise determining the quality of the radio uplink. The quality of the radio link may depend on the distance from the wireless device to the base station and/or the obstacles present on the radio uplink from the wireless device to the base station and/or the interference incurred on the radio uplink from the wireless device to the base station. In the present document, the quality of the radio uplink will also be referred to as the "distance" (from a radio link point of view). Furthermore, the methods for determining an indication of the quality of the radio uplink equally apply to the determining of the quality of the radio uplink.

The indication of the quality of the radio uplink (or the quality of the radio uplink) may be determined based on one or more (historic) parameters used for a previous transmission, e.g. a previous transmission of one or more bursts on the uplink from the wireless device to the base station. As such, the quality of the radio link on the uplink may be estimated based on historic or previous transmission parameters. The one or more bursts on the uplink may be access bursts and/or normal bursts. Preferably, the one or more bursts are normal bursts which were transmitted from the wireless device and received by the corresponding base station.

The one or more (historic) parameters used for the transmission of one or more previous bursts on the uplink may be one or more of: a power level, a modulation and coding scheme, or a timing advance. I.e. the one or more (historic) parameters may have different types. As will be outlined in more detail, the power level and/or the modulation and coding scheme and/or the timing advance used for a previous communication from the wireless device to the base station may be controlled by the base station, thereby providing a feedback on the quality of the radio uplink to the wireless device. Typically, this feedback is only available during an established communication between the wireless device and the base station (which may involve normal bursts), subsequent to a successful transmission of the initial transmission (which may be an access burst).

A combination of a plurality of types of (historic) parameters may be used to determine the indication on the quality of the radio uplink (or the quality of the radio uplink). In an embodiment, a separate indication on the quality of the radio link is determined based on each type of (historic) parameters, and an overall indication is determined by combining the plurality of separate indications. By way of example, the overall indication may be the separate indication which indicates a minimum or a maximum quality of the radio link. Alternatively, an average of the separate indications may be used as the overall indication of the quality of the radio link. In the following, several methods for determining a separate indication based on one type of (historic) parameters will be outlined. These separate indications may be combined to provide an overall indication of the quality of the radio link.

The determining of the quality or the indication of the quality may comprise providing a previous power level used for a previous transmission of one or more bursts on the uplink from the wireless device to the base station; and determining the indication based on the previous power level. A relatively low previous power level may indicate a relatively high quality, wherein a relatively high previous power level may indicate a relatively low quality of the radio link. By way of example, the possible power levels used by a wireless device may range from a minimum to a maximum power level. An indication of the quality of the radio link may be based on the previous power level relative to the maximum and/or minimum power level.

The determining of the quality or the indication of the quality of the radio uplink may comprise providing a plurality of previous power levels used for a plurality of previous transmissions of one or more bursts on the uplink; applying a filter to the plurality of previous power levels; and determining the indication based on the filtered plurality of previous power levels. As such, a plurality of parameters of the same type may be combined using a filter. By way of example, the filter may be one of an averaging filter with or without a forgetting factor; a median filter; and a maximum filter.

The plurality of previous power levels may correspond to the power levels used for a predetermined number of previously transmitted bursts and/or the power levels used during a predetermined time interval. By way of example, the power levels used for a number N of bursts which were transmitted during a previous communication with the base station may be taken into account. Alternatively or in addition, the power levels used during a plurality of communication sessions may be taken into account. In a preferred embodiment, the plurality of previous power levels is limited to the power levels used for successful transmissions, i.e. transmissions of bursts which have been received by the base station e.g. as indicated by acknowledgement information transmitted by the base station.

The determining of the quality or the indication of the quality of the radio uplink may comprise providing a previous modulation and coding scheme (MCS) used for a previous transmission of one or more bursts on the uplink from the wireless device to the base station; and determining the indication based on the previous modulation and coding scheme. By way of example, the robustness of the MCS may be an indication of the quality of the radio link, wherein a more robust MCS may indicate a lower quality and wherein a less robust MCS may indicate a higher quality.

In a similar manner to using the power level as a (historic) parameter, the determining of an indication of the quality of the radio link on the uplink may comprise providing a plurality of previous modulation and coding schemes used for a plurality of previous transmissions of one or more bursts on the uplink. The plurality of previous transmissions may be specified by a predetermined number of bursts or a predetermined time interval. The plurality of previous transmissions may originate from one or more previous communication sessions.

The indication may be determined based on one or more bit-rates of one or more previous modulation and coding schemes used during one or more previous communication sessions. In this case, the determining of an indication of the quality of the radio uplink may comprise determining a plurality of bit-rates associated with the plurality of previous modulation and coding schemes; applying a filter to the plurality of bit-rates; and determining the indication based on the filtered plurality of bit-rates.

The determining of (the indication of) the quality of the radio uplink may comprise providing a timing advance used for a previous transmission of one or more bursts on the uplink from the wireless device to the base station; and determining the indication or the quality based on the previous timing advance. The timing advance is an indication of the propagation delay from the wireless device to the base station, wherein a high timing advance may indicate a low quality of the radio link and vice versa.

In a similar manner to above, determining (the indication of) the quality of the radio link on the uplink may comprise providing a plurality of timing advances used for a plurality of previous transmissions of one or more bursts on the uplink; applying a filter to the plurality of timing advances; and determining the indication based on the filtered plurality of timing advances.

The determining of (the indication of) the quality of the radio uplink may comprise providing a receive signal level of a burst transmitted from the base station and received at the wireless device. As such, the signal level on the downlink from the base station to the wireless device may be used as an indication for the quality of the radio link on the uplink. A relatively low receive signal level may indicate a relatively low quality of the radio link on the uplink, and vice versa.

Furthermore, a minimum of the receive signal level which is required at the wireless device for accessing the base station may be provided. This minimum of the receive signal level may be predetermined within the network and/or it may be transmitted (e.g. broadcasted) from the base station to the wireless device. In this case, the indication of the quality of the radio link on the uplink may be determined based on the difference of the receive signal level and the minimum of the receive signal level.

More particularly, the determining of (the indication of) the quality of the radio uplink may further comprise providing a maximum of the receive signal level which the wireless device is configured to measure. This maximum may be predetermined by the network and/or transmitted (e.g. broadcasted) from the base station to the wireless device. In particular, this maximum (upper limit) for the MS performance requirements may be defined in a specification of the network (e.g. a 3GPP technical specification). The difference of the receive signal level and the minimum of the receive signal level may then be normalized by a difference of the maximum of the receive signal level and the minimum of the receive signal level. As such, the indication may be determined based on the normalized difference of the receive signal level and the minimum of the receive signal level.

The method may comprise the step of setting one or more control parameters for controlling the transmission of the initial transmission from the wireless device to the base station based on (the indication of) the quality of the radio link. The one or more control parameters for controlling the transmission may be one or more of: a power level used for the transmission of the access burst; an increased power level used for the re-transmission of the access burst; a number of allowed retries for the re-transmission of the access burst; a backoff time or a backoff time interval for controlling the waiting time between two succeeding transmissions of an initial transmission (wherein succeeding initial transmissions may be different from one another). As such, a plurality of control parameters may be modified in order to control the transmission of the initial transmission.

The control parameter may be a power level of the transmission and the operation of setting the control parameter may comprise modifying, i.e. increasing and/or decreasing, the power level based on (the indication of) the quality of the radio uplink. By way of example, a higher power level may be set if a relatively low quality of the radio link is indicated. The initial transmission may be transmitted using the set power level. Subsequent to not receiving an acknowledgment to the transmission of the initial transmission, the power level for the transmission of a succeeding initial transmission may be increased. The acknowledgement is typically transmitted from the base station to the wireless device.

The control parameter may be a number of allowed retries for the re-transmission of an initial transmission, subject to not receiving an acknowledgment to the transmission of a preceding initial transmission. Setting the control parameter may comprise modifying, i.e. increasing and/or decreasing, the number of allowed retries based on (the indication of) the quality of the radio link. Typically, the number of allowed retries is the number of allowed retries counted from the first of the initial transmissions.

The control parameter may be a backoff time interval (or dead time interval) ranging from a lower backoff time to an upper backoff time. The lower backoff time may specify a lower limit for the waiting time between succeeding transmissions of the initial transmission and the upper backoff time may specify an upper limit for the waiting time between succeeding initial transmissions. In other words, a backoff time may be indicative of a waiting time for the transmission of an initial transmission, subject to not receiving an acknowledgment to the preceding initial transmission.

The setting of the initial parameter may comprise increasing and/or decreasing the backoff time interval based on (the indication of) the quality of the radio uplink. In particular, the upper backoff time of the backoff time interval may be modified. By way of example, a relatively low upper backoff time of the backoff time interval may be used if a relatively low quality of the radio uplink is indicated. The lower limit of the backoff time interval, i.e. the lower backoff time, may be (in addition or alternatively) similarly modified. The actual backoff time used at the wireless device may be selected as a random value from the backoff time interval.

According to another aspect, a method for controlling one or more transmissions comprising an initial transmission (e.g. an access burst) on an uplink from a wireless device to a base station is described. For possible embodiments of the initial transmission, the wireless device and/or the base station, reference is made to the related features outlined in the present document.

The method may comprise providing a current timing advance indicative of a propagation delay from the wireless device to the base station. The current timing advance may be determined based on the one or more timing advances used during one or more previous transmissions of the wireless device to the base station. In particular, the current timing advance may be determined from the one or more timing advances used for the transmission of normal bursts during one or more communication sessions or by any other known means.

The method may comprise selecting an access timing advance based on the current timing advance. In particular, the access timing advance may be selected to be different from zero. The access timing advance is the timing advance used for transmitting the access request or initial transmission from the wireless device to the base station.

Selecting an access timing advance may comprise selecting the access timing advance from a set of timing advance values ranging from the current timing advance to the current timing advance minus the length of a guard period of the initial transmission. As indicated above, the length of the initial transmission may be shorter than the length of a time slot used within the network. The difference in length may be referred to as the guard period. In other words, the guard period of the initial transmission may correspond to the difference of a number of symbols per time slot and a number of payload symbols of the initial transmission.

As such, the transmission of the initial transmission may be advanced at the maximum by the current timing advance and at the minimum by the difference between the current timing advance and the length of the guard period. It should be noted that a negative access timing advance corresponds to an effective delay of the initial transmission by the absolute value of the access timing advance.

The access timing advance may be selected from the set of timing advance values using a predetermined offset from the current timing advance. This predetermined offset may be fixed for the wireless device. In other words, the access timing advance may correspond to the current timing advance plus a predetermined offset, wherein the predetermined offset does not exceed the length of the guard period.

Alternatively, the access timing advance may be selected from the set of timing advance values using an offset from the current timing advance, wherein the offset is selected from a predetermined hopping sequence of offsets attributed to the wireless device. The predetermined hopping sequence of offsets may be designed to have a reduced correlation to one or more predetermined hopping sequences of offsets used for one or more other wireless devices.

Alternatively, the access timing advance may be selected randomly from the set of timing advance values.

The method may further comprise transmitting the initial transmission on the uplink using the access timing advance. This means, instead of sending the access burst at a fixed timing advance of zero, the access timing advance may be selected as described in the present document, in order to reduce the probability of a collision of a plurality of initial transmissions.

The method may further comprise receiving at the wireless device an indication of a maximum timing advance used by wireless devices served by the base station. This maximum timing advance may be broadcasted by the base station and may be an indication of the maximum propagation delay of the wireless devices currently served by the base station. As such, the maximum timing advance may be an indicator of the size, i.e. the geometric dimensions, of the cell.

Using this information, the current timing advance may be determined based on the received maximum timing advance. In particular, the current timing advance may correspond to the maximum timing advance. In a similar manner, the access timing advance may be selected based on the current timing advance and the received maximum timing advance. By way of example, the access timing advance may be selected such that the probability of a collision with the initial transmissions of other wireless devices is reduced. For this purpose, it may be assumed that the other wireless devices transmit their initial transmissions at a timing advance of zero. Alternatively or in addition, the length of a payload of the initial transmission may be adjusted, e.g. increased or decreased, based on the received maximum timing advance. By doing this, the probability of colliding initial transmissions may be reduced.

According to another aspect, a wireless device configured to communicate with a base station is described. The wireless device may be configured to perform any of the methods and aspects outlined in the present document. Furthermore, the wireless device may comprise any of the features outlined in the present document.

According to a further aspect, a software program is described. The software program may be stored on a computer-readable medium (which may be tangible or otherwise non-transitory) as instructions that are adapted for execution on a processor and for performing the aspects and features outlined in the present document when carried out on a computing device.

According to another aspect, a storage medium comprising a software program is described. The storage medium may be memory (e.g. RAM, ROM, etc.), optical media, magnetic media and the like. The software program may be adapted for execution on a processor and for performing the aspects and features outlined in the present document when carried out on a computing device.

According to a further aspect, a computer program product is described. The computer program product may comprise executable instructions for performing the aspects and features outlined in the present document when executed on a computing device.

Particular aspects of the present document include the following examples:

In one example, a method for controlling one or more transmissions between a wireless device and a base station, the one or more transmissions including at least an initial transmission, includes: determining the quality of a radio uplink between the wireless device and the base station, the quality being based on at least one parameter associated with a previous transmission; setting a control parameter for controlling the transmission between the wireless device and the base station based on the determined quality of the radio uplink; and transmitting the initial transmission.

In one example, the control parameter is a power level.

The method may also include subsequent to not receiving an acknowledgment to one of the one or more transmissions, increasing the power level for a succeeding transmission.

In the methods of any previous aspect, the control parameter may be a number of allowed retries. Setting the control parameter may include setting a backoff time interval; and selecting a backoff time as a random value from the backoff time interval.

The initial transmission may be an access burst.

In the methods of any previous aspect, the at least one parameter used for determining the quality of the radio uplink is one or more of: a power level, a modulation and coding scheme, or a timing advance.

In the methods of any previous aspect, the at least one parameter is a previous power level used for the previous transmission. Determining the quality may include providing a plurality of previous power levels used for a plurality of previous transmissions on the radio uplink; applying a filter to the plurality of previous power levels; and determining the quality based on the filtered plurality of previous power levels.

In one example, the filter is one of an averaging filter with or without a forgetting factor; a median filter; and a maximum filter. In the foregoing aspects, the plurality of previous power levels corresponds to the power levels used for a predetermined number of previously transmitted bursts and/or the power levels used during a predetermined time interval. The plurality of previous power levels may be limited to the power levels used for successful transmissions. The at least one parameter may be a previous modulation and coding scheme used for a previous transmission. The quality may be determined based on a bit-rate of the previous modulation and coding scheme. Additionally or alternatively, determining the quality may include providing a plurality of previous modulation and coding schemes used for a plurality of previous transmissions on the radio uplink; determining a plurality of bit-rates associated with the plurality of previous modulation and coding schemes; applying a filter to the plurality of bit-rates; and determining the quality based on the filtered plurality of bit-rates.

In any of the previous aspects, the at least one parameter may be a timing advance used for a previous transmission on the radio uplink. Additionally, determining the quality may include providing a plurality of timing advances used for a plurality of previous transmissions on the radio uplink; applying a filter to the plurality of timing advances; and determining the quality based on the filtered plurality of bit-rates.

In accordance with some of the foregoing aspects, a previous transmission on the radio uplink comprises the previous transmission of one or more normal bursts.

In any of the previous aspects, determining the quality comprises providing a receive signal level of a transmission from the base station to the wireless device; providing a minimum of the receive signal level which is required at the wireless device for accessing the base station; and determining the quality based on a difference of the receive signal level and the minimum of the receive signal level.

Determining the quality may include providing a maximum of the receive signal level which the wireless device is configured to measure; normalize the difference of the receive signal level and the minimum of the receive signal level by a difference of the maximum of the receive signal level and the minimum of the receive signal level; and determining the quality based on the normalized difference of the receive signal level and the minimum of the receive signal level.

An example method for controlling one or more transmissions between a wireless device and a base station, the one or more transmissions including at least an initial transmission, may include providing a current timing advance indicative of a propagation delay from the wireless device to the base station; selecting an access timing advance based on the current timing advance; and transmitting the initial transmission using the access timing advance.

Selecting an access timing advance may include selecting the access timing advance from a set of timing advance values ranging from the current timing advance to the current timing advance minus the length of a guard period of the initial transmission. In one example, the access timing advance is selected from the set using a predetermined offset from the current timing advance; and the predetermined offset is fixed for the wireless device. In another example, the access timing advance is selected from the set using an offset from the current timing advance; and the offset is selected from a predetermined hopping sequence of offsets attributed to the wireless device. The predetermined hopping sequence may be designed to have a reduced correlation to one or more predetermined hopping sequences used for one or more other wireless devices.

In one example, the access timing advance is selected randomly from the set. Additionally, in accordance with some of the foregoing examples, the guard period of the initial transmission corresponds to a difference of a number of symbols per time slot and a number of payload symbols of the initial transmission. The method may further include receiving at the wireless device an indication of a maximum timing advance used by wireless devices served by the base station. The method may further include determining the current timing advance based on the received maximum timing advance. The access timing advance may be selected based on the current timing advance and the received maximum timing advance.

The method of certain example aspects above may also include adjusting the length of a payload of the initial transmission based on the received maximum timing advance. In accordance with the examples herein, the initial transmission may be a GERAN access burst used in a GERAN; the initial transmission may be transmitted on a random access channel, referred to as RACH; the initial transmission may include a payload which comprises tail bits, synchronization sequence bits, and/or encrypted bits; the initial transmission may be shorter than a time slot of the GERAN, a guard period being the difference of the length of the time slot and the length of the initial transmission; the wireless device may be a GERAN mobile station; and/or the base station may be a GERAN base station.

As described herein, a wireless device may be configured to communicate with a base station, wherein the wireless device is configured to perform any of actions and/or aspects described above. In one example, the wireless device moves at a speed lower than a speed threshold and/or within an area smaller than an area threshold.

As described herein, a software program may be adapted for execution on a processor and for performing any of the actions and/or aspects described above when carried out on a computing device. A storage medium may include a software program adapted for execution on a processor and for performing the actions and/or aspects described above when carried out on a computing device. A computer program product may include executable instructions for performing the actions and/or aspects described above when executed on a computing device.

It should be noted that the methods and systems including various example embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

SHORT DESCRIPTION OF THE FIGURES

Various aspects are explained below in an exemplary manner with reference to the accompanying drawings, wherein FIG. 1 illustrates the use of an example timing advance for the alignment of data bursts with the time slots at the base station;

DETAILED DESCRIPTION OF THE FIGURES

The random access channel (RACH) is a shared resource in a GERAN with collision detection, but not collision avoidance. The transmission of access bursts on the RACH is scheduled according to a form of the slotted ALOHA protocol. In contrast to a pure ALOHA protocol, where data packets, e.g. access bursts, are transmitted at arbitrary time instants, the slotted ALOHA protocol makes use of time slots within which the data packets can be transmitted. In GERAN a particular carrier is sub-divided into 8 physical carriers or time slots, wherein data bursts transmitted from a BTS and data bursts received at the BTS should be aligned to these time slots.

In order to take into account the propagation delay between a MS and a corresponding BS, and in order to ensure the alignment of the bursts which are transmitted by the BS to the MS and the bursts which are transmitted by the MS to the BS, GERAN makes use of a so called timing advance (TA). In particular, on a traffic channel (TCH) or on a slow associated control channel (SACCH), the BS expects to receive bursts from an MS which are time aligned to the bursts that the BS sends to the MS. This alignment should be independent of the relative location of the MS and BS. For this purpose, the MS uses the bursts which it receives from the BS as a time reference. By way of example, the MS may use bursts which are transmitted by the BS on the BCCH to synchronize with the time slots of the BS. In an embodiment, the MS is camped on the network cell provided by the BS.

In order to compensate for the propagation delay from the BS to the MS and back to the BS on the radio path, the MS may need to advance the transmission of bursts compared to the time slots of the received bursts. The value of the advanced transmission, i.e. the timing advance (TA), depends on the geographical distance between the MS and BS and is currently calculated by the BS. The BS determines the TA of a particular MS based on the transmissions (including e.g. RACH transmissions, access burst transmissions) which it receives from the particular MS. The RACH transmissions are typically sent by the MS with TA=0. As such, the BS can determine the propagation delay of the received RACH transmissions. The determined TA is communicated to the MS, in order to enable the MS to use the appropriate TA on subsequent non-RACH transmissions, and to thereby align its transmitted bursts to the time slots of the BS.

Figure 1:
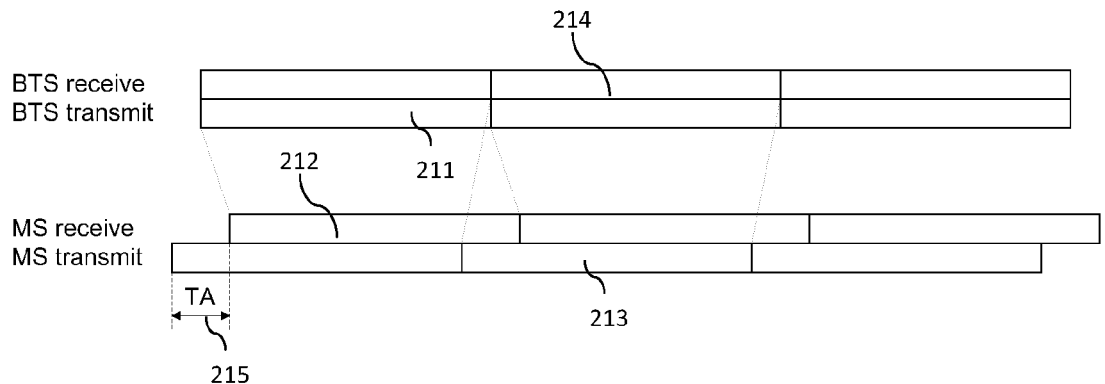

The use of the timing advance is illustrated in FIG. 1. The BTS transmits a burst 211 to the MS. The MS receives the delayed burst 212, wherein the delay of the burst corresponds to TA/2, i.e. to half of the value of the timing advance. In order to ensure that a burst 213 which is transmitted by the MS is received by the BTS as a received burst 214 that is aligned with the time slot structure of the initially transmitted burst 211, the MS has to offset the transmission of burst 213 in comparison to the reception of burst 212. The offset time interval corresponds to TA. It should be noted that the propagation delay on the uplink (UL) may be different from the propagation delay on the downlink (DL) as the signals on the UL and on the DL might not follow the same path. This is typically due to the 45 MHz frequency offset between the UL and the DL. As such, the delay of the burst 212 may be different from TA/2.

It should be noted that the transmissions from multiple devices in the cell (which may be at different distances from the BS) do not overlap, and preferably arrive aligned to the BS time reference. However, it is not necessary that the receiver (RX) and transmitter (TX) time references at the BS coincide and there may be an offset (transparently to the MS) between the RX and TX time frames at the BS.

As indicated above, when an MS needs to access a BS on a RACH, the MS sends an access burst with a timing advance (TA) value of 0 and waits for a response from the BS. If the MS does not receive a response, this may be due to a collision of the transmitted access burst with an access burst sent from another MS. After a random delay, the MS sends another access burst and repeats this procedure until it receives a response from the base station or until the maximum number of allowed attempts is reached.

The retry procedure of the MS may be describes as follows:
The MS sends maximally (M+1) messages on the RACH. M is a predetermined number of retries and may be preset in the MS or may be received from the network via a BS. In other words, the MS sends a first access burst and possibly up to M retry access bursts.

After having sent the first access burst, the MS starts listening for a response from the BS. If the MS receives a valid response from the BS the access procedure ends successfully.

On the other hand, if no response is received from the BS, the MS transmits a further access burst. Prior to sending a further access burst, the MS may wait for a certain number of time slots. The number of transmit occasions (i.e. time slots) that are skipped between two successive access bursts may be a random value drawn from a set of values which may be specific for each MS. The values from the set of values may have a uniform probability.

After having sent (M+1) access bursts, the MS typically starts a timer. If the timer expires before the MS has received a response from the BS, the procedure ends unsuccessfully.

Figure 2:
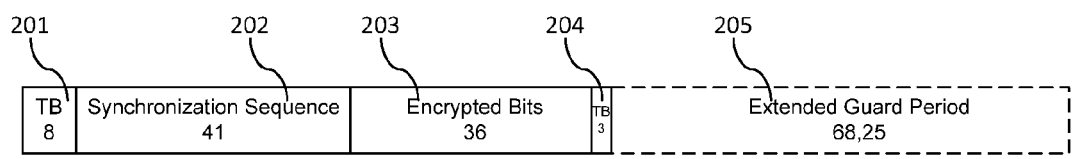
FIG. 2 illustrates an example structure of an access burst.

FIG. 2 illustrates an example structure of an access burst 200 used in GERAN. As indicated above, the access burst is used for random access and comprises a longer guard period (68.25 bit duration or 252 µs) compared to a normal burst, in order to cater for burst transmission from a mobile station which may not know the timing advance to be used with the BS at the first access (or after handover from another BS). The access burst 200 comprises extended tail bits 201, a synchronization sequence 202, encrypted bits 203, a tail bit 204 and the extended guard period 205. The length and content of the different fields of the access burst 200 are provided in Table 1.

TABLE 1

| Bit Number (BN) | Length of field | Contents of field | Definition |
| --- | --- | --- | --- |
| 0-7 | 8 | extended tail bits | Note 1 |
| 8-48 | 41 | synch. sequence bits | Note 2 |
| 49-84 | 36 | encrypted bits (e0 . . . e35) | TS 45.003 |
| 85-87 | 3 | tail bits | Note 3 |
| 88-156 | 68, 25 | extended guard period (bits) | |

Note 1:
the "extended tail bits" 201 are defined as modulating bits with the following states: (BN0, BN1, BN2, . . . , BN7) = (0, 0, 1, 1, 1, 0, 1, 0).
Note 2:
the "synch. sequence bits" 202 are defined as modulating bits with the following states: (BN8, BN9, . . . , BN48) = (0, 1, 0, 0, 1, 0, 1, 1, 0, 1, 1, 1, 1, 1, 1, 1, 1, 0, 0, 1, 1, 0, 0, 1, 1, 0, 1, 0, 1, 0, 1, 0, 0, 0, 1, 1, 1, 1, 0, 0, 0).
Note 3:
the "tail bits" 204 are defined as modulating bits with the following states: (BN85, BN86, BN87) = (0, 0, 0). The encrypted bits 203 are defined in the technical specification 3GPP TS 45.003 which is incorporated by reference.

Due to the fact that the access bursts for transmitting a RACH are sent with maximum power, MSs close to the base station have a higher likelihood of getting a response from the base station than MSs which are further away from the BS. Even in the case that no collision occurs, a transmission received with a higher signal level will typically be decoded correctly with a higher probability than a transmission received with a lower signal level. In the case where there is a collision between access bursts from a near MS and a far MS, the base station will often be able to decode the RACH of the near MS and ignore the RACH from the far MS. Since MSs are normally moving, this advantage of proximity to the BS for a given MS typically exists only temporarily and, on average, does not have a significant impact on the performance of the channel access procedure. However, a stationary MS at a fixed location which is relatively far away from the serving BS may have a repeatedly lower probability of receiving a response to a RACH transmission from the BS. As such, there is a need for an improved procedure for RACH transmission and acknowledgement.

A GERAN network may provide the functionality of uplink (UL) power control. The objective of the power control function is the reduction of interference levels while maintaining the quality of service of a connection. This results in an increase in spectral efficiency and capacity on the air interface. Additionally or alternatively, power control in the UL can be used to reduce the power consumption of the MS.

The principle of UL power control is to keep the received power level and/or the received link quality at the BS in a range of good values, i.e. a range exceeding certain minimal power level and/or quality thresholds. If the power level and/or the quality of a connection is detected to exceed these thresholds by a predetermined value, the BS may command the transmitting MS to lower the transmit power level. In other words, the power control of the BS comprises the commanding of a certain transmit power level at the MS. Typically, the MS of a GERAN network provide an UL power control functionality, the implementation in the BS may be provided optionally. In GERAN, uplink power control is implemented by means of commands sent from the BS to the MS. In other words, UL power control is a closed-loop power control. The UL power control functionality is mainly used in the context of voice connections, i.e. voice traffic channels (TCH).

Alternatively or in addition to controlling the transmit power on the uplink, the modulation and coding scheme (MCS) may be modified at the MS. The bit-rates for data depend on the coding schemes used. GPRS uses four coding schemes (CS-1 to 4) while EDGE uses nine Modulation and Coding Schemes (MCS-1 to 9). The possible bit-rates for the transmission of packet switched data in a full-rate channel are listed in Table 2.

TABLE 2

| Modulation and Coding Scheme (MCS) | Bandwidth (kbit/s/time slot) | Modulation |
| --- | --- | --- |
| CS-1 | 8.0 | GMSK |
| CS-2 | 12.0 | GMSK |
| CS-3 | 14.4 | GMSK |
| CS-4 | 20.22 | GMSK |
| MCS-1 | 8.80 | GMSK |
| MCS-2 | 11.2 | GMSK |
| MCS-3 | 14.8 | GMSK |
| MCS-4 | 17.6 | GMSK |
| MCS-5 | 22.4 | 8-PSK |
| MCS-6 | 29.6 | 8-PSK |
| MCS-7 | 44.8 | 8-PSK |
| MCS-8 | 54.4 | 8-PSK |
| MCS-9 | 59.2 | 8-PSK |

The coding schemes differ in their robustness, wherein the less robust coding schemes providing higher bandwidth are typically available near base transceiver stations (BTS) and the more robust coding schemes, providing lower bandwidth, are still available when the MS is at further distances to the BTS. As such, if the BS determines a reception power level and/or quality exceeding the respective thresholds by the predetermined value, the BS may instruct the MS to switch to a less robust MCS allowing for a higher bit-rate.

As has been indicated above, stationary devices, like smart meters, that are located relatively far from their serving base station typically have the disadvantage of a lower received signal level for the RACH at this base station compared to devices located relatively near to the same base station. Typically, the serving base station is the nearest base station of the stationary device, but due to network management aspects, this may not be the case.

It should be noted that the terms "distance", as well as "near" and "far" do not necessarily characterize the geographical location of an MS relative to a base station. The terms rather describe the properties of the radio link. An MS located at a relatively close geographical distance to a base station, but in the basement of a building can, considering the radio link, be further away from that base station than an MS with a line of sight radio link at a larger geographical distance. This is a particular issue with stationary devices such as smart meters which are often located in the basement of buildings and which are therefore at a "far distance" (from a radio link point of view) to the serving BTS.

Due to the fact that a particular stationary device does not move, it is continuously at a disadvantage with respect to other mobile stations which have a "shorter radio link distance". This imbalance results in a lower probability for a successful channel access for the particular stationary device.

A possible way for addressing this imbalance issue may be to base the power level, which is used by a MS for requesting channel access, on the distance from the MS to the BS, wherein the term distance is understood to be an indication of the quality of the radio link from the MS to the BS. For this purpose, the "nearness" or "farness" of an MS may be estimated by the MS and used as a parameter for the modified RACH transmission approaches. The estimates of the "distance" from the MS to the BS may be based on one or more of the following approaches:

Estimate Based on the Previous Power Level

The "distance" from the MS to the BS may be based on the commanded power level in the uplink that was used for the one or more last uplink activities. In other words, the MS determines the power level which has been used on the uplink during previous communications with the BS. Typically, this one or more power level has been commanded by the BS as a result of the above described UL power control scheme. In a preferred embodiment, the one or more power levels used for estimating the "distance" are limited to the power levels used during successful transmissions. As such, the transmit power levels of previous uplink transmissions may provide an indication for the "distance" from the MS to the BS. Typically, it may be stated that the higher the used power level on the uplink, the higher the "distance" from the MS to the BS.

Estimate Based on the Previous Modulation/Coding Scheme (MCS)

Alternatively or in addition, the MS could estimate the "distance" from the MS to the BS based on the last or the sequence of last commanded UL MCS(s). This is particularly relevant for packet data connections and/or voice (AMR) connections, where the BS instructs the MS to modify the MCS (and consequently the bit-rate) in dependence on the power level/quality of the uplink connection from the MS. Typically, all other things being equal, it may be stated that the fact that a less robust MCS is commanded by the BS, indicates a lower "distance" from the MS to the BS. In the case of voice connections using AMR, the codec mode (i.e. the AMR mode) which has been used on one or more last communications on the UL may be used to estimate the "distance" from the MS to the BS.

Estimate Based on a Received Cell Signal Level

Alternatively or in addition, the "distance" from the MS to the BS may be estimated based on the difference between the received signal level from the BS (RXLEV) and the minimum signal level in that cell (RXLEV_ACCESS_MIN). The latter information may be broadcasted by the serving BTS (e.g. via the BCCH). As such, a nearness factor (NNF) indicating the "distance" from the MS to the BS may be estimated as $$NNF = 1 - \frac{RXLEV - RXLEV\_ACCESS\_MIN}{RXLEV\_MAX - RXLEV\_ACCESS\_MIN},$$

with
- the Nearness factor NNF providing an estimate of the relative distance from the MS to the BS;
- RXLEV being the received power level of the BS signal at the MS, either as a single sample or averaged over multiple measurements;
- RXLEV_ACCESS_MIN being a minimum received signal power level at the MS required for accessing to the network; and
- RXLEV_MAX being the maximum signal strength that any MS is required to measure (typically −48 dBm).

This estimate of the "distance" from the MS to the BS is based on measurements of the path quality in the downlink direction. Due to the duplex distance of 45 MHz used in GERAN, i.e. due to the difference in frequency between the frequency band on the uplink and the frequency band on the downlink, estimates on the "distance" of the uplink channel based on parameters of the downlink channel conditions may not be reliable. This is due to the fact that interference and multipath conditions may differ on the uplink and on the downlink due to the different frequency bands used for both directions.

Estimate Based on Previous TA Values

As has been outlined above, the timing advance (TA) parameter is used to compensate for propagation delays on the radio link between the BS and the MS. In particular, a MS advances the transmission of a burst to the BS by a time interval corresponding to the value of TA (with respect to the timing of a burst received from the BS), in order to ensure that the bursts which are received at the BS are aligned with the time slots of the bursts that are transmitted from the BS. As such, the TA value is an indicator of the geographical distance between the BS and the MS, which also has an impact on the "distance" (from a radio link point of view) from the MS to the BS. The BS may use a "TA offset", that is, it may align the reception of transmissions from MSs to a time reference that is offset from that used for its transmissions. In this case, the TA that is signalled to an MS during an uplink communications session may be different from that which would be signalled if the TA offset were not used. To assist the MS in determining the "distance" from the MS to the BS based on assigned TA values, the BS may indicate (e.g. by broadcast or point-to-point signalling) whether such an offset is used (and, if it is used, the value of the offset).

The above mentioned estimates for the "distance" from the MS to the BS, as well as other estimates, may be used alone or in any combination to provide an overall estimate of the "distance". It should be noted that the "distance" from the MS to the BS, i.e. the "distance" on the uplink is estimated. As outlined above, this UL "distance" may be different from the downlink (DL) "distance" (from a radio link point of view).

Based on the estimated "distance", the transmission power for RACH transmissions from the MS to the BS may be determined as follows. The power level for the access burst transmitted on the RACH may be increased compared to a reference power level, if the BS is estimated to be at a far "distance" from the MS. In other words, if the estimated "distance" is above a distance threshold, the power level for transmitting an access burst may be increased. Alternatively or in addition, the transmission power for RACH transmissions may be decreased, if the BS is estimated to be at a near "distance" from the MS. In other words, if the estimated "distance" from the MS to the BS is below a (possibly different) distance threshold, the power level for RACH transmission may be decreased. As such, the power level for RACH transmission may be set depending on the "distance" from the MS to the BS. Consequently, the probability for a successful RACH transmission for different MSs at different "distances" to the BS can be harmonized.

The above mentioned "distance" dependent power level management for RACH transmission may be modified and/or refined in various ways. The modifications and/or refinements may be used standalone or in combination with one another. By way of example, the MS may apply a predetermined offset to the power level which is determined based on the above mentioned estimates. The value of such an offset could be predefined, broadcasted by the base station (e.g. via the BCCH), or communicated to the MS on a point-to-point basis. The predetermined offset could be used to ensure that the determined power levels for the RACH transmission are not too low and/or not too high, i.e. in order to ensure a minimum channel access performance and/or in order to limit the MS power consumption or to avoid a shielding of other MSs by a particular MS. As such, the base station may command the MS to transmit at a higher or lower power level than the estimated power level and thereby have a certain control of the access procedure. By way of example, the base station may (temporarily) deactivate power level estimation (e.g. power level reduction) by setting a high predetermined offset.

In an embodiment, the MS might apply a filtering of previously used output power levels in order to determine the estimate of the "distance" from the MS to the BS. Examples for such filtering methods are: a running average (with or without a forgetting factor); a median or maximum power level used for the last N data blocks or during the last T seconds, or a combination of the data blocks sent and the time elapsed. As such, the estimates of the "distance" may be determined based on a plurality of filtered previous power level values.

In an embodiment, the MS is configured to increase the power level for the RACH transmission after a defined number N of unsuccessful attempts. The power level may be increased by a predefined value. The power level increase may be performed for each retry. By way of example, if the access attempt has failed due to no response, the same power may be used for the first repeated access attempt, and in case more repetitions are allowed in the cell, the output power may be raised by a predetermined or signalled value for remaining access attempts. As such, the probability for a successful RACH transmission may increase with every retry.

A further approach to harmonizing the probability of a successful RACH transmission for the different MSs served by a BS may be the use of a modified retry algorithm. The retry algorithm may be modified in a way to balance the success rate of RACH transmissions between "near" and "far" MSs. For example, a "near" MS might be allowed fewer retries and/or might have to wait longer after an unsuccessful attempt before it sends the next access burst. A modified retry algorithm for the RACH transmission may be used standalone or in conjunction with the other methods outlined in the present document. Furthermore, the "distance" of the MS to the BS may be determined in accordance to any of the estimation methods outlined in the present document.

Within the retry algorithm, there are two parameters that can be adapted to balance the success probability for RACH transmission between a "near" and a "far" MSs:
  M—the number of allowed retries, and/or
  the random value which defines how many potential transmit slots are skipped between two successive attempts of RACH transmission.

These two parameters can be modified as follows: The number of allowed retries M may be reduced for "near" MSs. The reduction of the number of allowed retries M may be related to the "distance" from the MS to the BS. Alternatively or in addition, a distance-dependent dead time ($DT_{dist}$) between two successive RACH transmissions may be set. Based on the minimum dead time of the legacy retry procedure, wherein the minimum dead time may be a randomly generated value, the minimum dead time may be increased and/or decreased in dependence on the "distance" from the MS to the BS. In other words, the variance of the randomly generated values for the dead time between two successive RACH transmissions may be increased and/or decreased in dependence on the "distance" from the MS to the BS. In general terms, the parameters used to define the distribution from which the random "dead time" or backoff time value is drawn may be thus varied.

Alternatively or in addition to the methods outlined above, the success rate for RACH transmission may be increased by setting a fake initial timing advance for the transmission of access bursts. Instead of using always TA=0 for the access burst, the MS may use a variable TA. The MS may know its true TA from previous transmissions, so it may know by how much it can shift the transmission of an access burst without causing interference to adjacent time slots. The MS may know its true TA, if it has determined that it has not moved away from the position of the last transmission and if it has determined that it is accessing the same base station. In particular, a stationary MS may know its true TA from a previous transmission.

When knowing the true TA, the TA for transmitting the access burst may be chosen randomly in an interval, which may be specific to each MS. Alternatively, the TA may be chosen such that the reception of the access burst occurs either (such as alternately) in the first and second half of a time slot. The transmission of the access burst may occur with or without a (small) additional random offset. Alternatively, the choice of the TA may follow a defined pattern which may be referred to as a "TA hopping sequence".

As indicated above, it is assumed that the MS knows its real TA value, e.g. from a previous transmission and the knowledge that its position did not change significantly in the meantime. This is typically the case for stationary MSs. If the MS knows its true timing advance value $TA_{true}$, it can send the access burst with this TA value (instead of TA=0) without causing interference to the adjacent earlier time slot. In a similar manner, it can delay the transmission by $68.25-TA_{true}$ symbol periods without causing interference to the adjacent later time slot. This is due to the fact that the length of a GERAN time slot is 156.25 symbols, whereas the length of an access burst without the extended guard period is 88 symbols. In an embodiment, the maximum value for $TA_{true}$ is 63.

Figure 3:
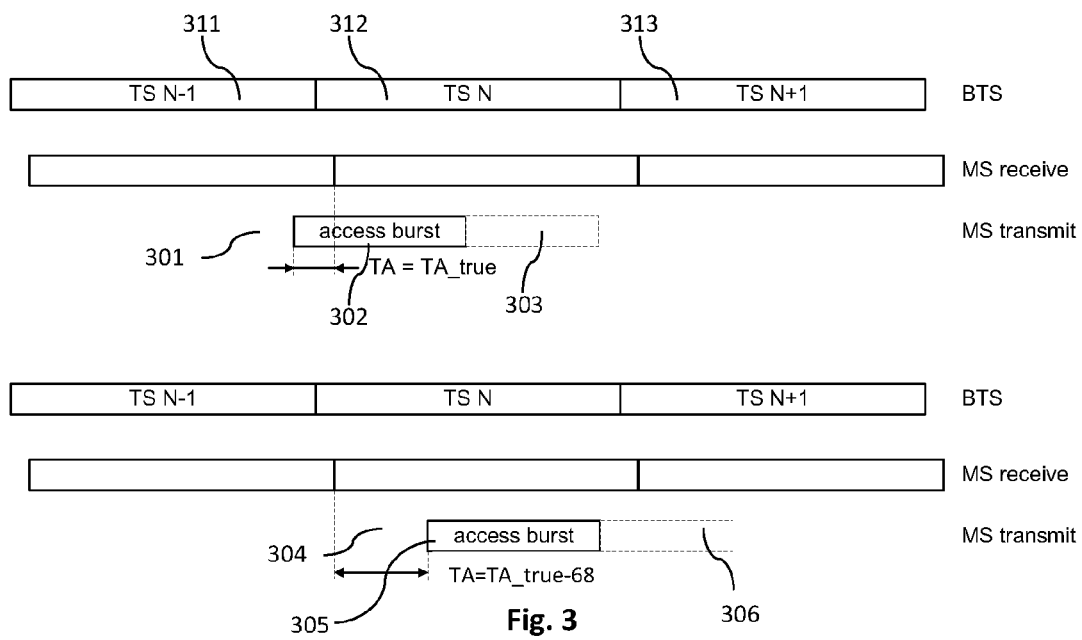
FIG. 3 shows the variation of the timing advance used for the example transmission of an access burst.

This is illustrated in FIG. 3, where an access burst 301 is shown which is transmitted with a timing advance of $TA_{true}$. The access burst 301 comprises a payload section 302 and an extended guard section 303. It can be seen that when transmitting the access burst 301 at a timing advance of $TA_{true}$, the payload section 302 of the access burst 301 reaches the BTS within time slot N (reference numeral 312). There is no interference with the previous time slot N−1 (reference numeral 311) and the succeeding time slot N+1 (reference numeral 313). In a similar manner, it can be seen that if the access burst 304, which comprises a payload section 305 and an extended guard section 306, is transmitted at a timing advance of $TA_{true}-68$ (or even $TA_{true}-68.25$), the payload section 305 reaches the BTS within time slot N (reference numeral 312), and there is no interference with the previous time slot N−1 (reference numeral 311) and the succeeding time slot N+1 (reference numeral 313).

For sending the access burst 301, the MS may use always a same TA value from the set $[TA_{true}, TA_{true}-68.25]$. Alternatively, the MS may choose a random value with uniform probability from the set $[TA_{true}, TA_{true}-68.25]$. Alternatively, the MS may select a value following a predefined sequence (in a similar manner to hopping sequences used for frequency hopping). The predefined sequence may be different for the different MS served by the BTS. The different predefined sequences used by the different MSs may be orthogonal with respect to one another. In other words, the different predefined sequences may be designed to reduce or minimize collisions between the access bursts sent by the different MSs.

It should be noted that subsequently to receiving an access burst from the MS, the BS informs the MS about the TA value. Since the BS typically assumes that the access burst was sent by the MS with TA=0, the MS may need to correct the TA value that it receives from the BS by the actual TA value which the MS used for sending the access burst. The corrected TA value may then be used for the subsequent communication from the MS to the BS. The MS may proceed with subsequent communications without informing the network of its actual TA value (i.e. the one which the BS would have signalled had the MS used TA=0 for its access burst). In some embodiments, the MS informs the network of its actual TA value or indicates that it used a non-zero TA value for its access burst.

The benefit of the approach of using a fake TA value is that it increases the probability that the payload section 302 of "colliding" access bursts 301, i.e. access bursts 301 from different MSs that arrive at the BS within the same time slot 312, do not overlap in time. By using this approach it can at least be achieved that the probability of an overlap of the payload sections 302 is reduced. Consequently, the probability that at least one of the colliding access bursts 301 (rather than none of the colliding access bursts) will be received correctly at the BS may be increased. Overall, it may be stated that by modifying the timing advance used for the transmission of the access burst, the allowable time instant for transmitting the access burst is selected in order to reduce or minimize the probability of overlap with access bursts of other MSs.

As a further option which may be used when selecting a time advance for the transmission of the access burst, a BS may transmit an indication of its maximum typical TA, e.g. an indication of the largest TA that is assigned to any of the MS which are currently served by the BS. This information may be broadcasted via the BCCH. As such, a particular MS may be aware of the maximum used TA value within the current cell. This knowledge can be used to adjust the TA which is used by the particular MS for the transmission of the access burst. In particular, the TA which is used by the particular MS may be adjusted in order to reduce or minimize the probability of overlap with legacy RACH transmissions, i.e. with transmissions at TA=0. Alternatively or in addition, the length of the access burst which is transmitted to the BS by the particular MS may be modified in order to reduce or minimize the probability of overlap of a plurality of access bursts sent by a plurality of MSs. By way of example, if the maximum typical TA used within the cell is low, then all legacy devices, i.e. devices which transmit on the RACH with a TA=0, will transmit their access bursts very close to the correct TA (because the correct TA is low and therefore close to TA=0).

Furthermore, the information regarding the maximum typical TA used within the cell may be used as an indication of the value of $TA_{true}$, i.e. as an indication for information on the true timing advance value of the particular MS. By way of example, if the TAs assigned in the cell are usually low, i.e. if the maximum typical TA communicated by the BS is low, then the particular MS has an indication that even when adding a significant offset to the TA used for transmitting the access burst, it is unlikely that the transmitted access burst crosses over timeslot boundaries when received by the BTS.

The selection of timing advance may be based on the relative priority of the access attempt. For example, low priority or latency-tolerant transmissions (or access burst transmissions associated with the transfer of low priority or latency tolerant data) may be sent with a timing advance such that the BS receives the transmission later within a timeslot than other transmissions (including those from legacy devices). This may allow the BS to successfully decode a non-low priority access burst or transmission, even though a low priority access burst/transmission was received during the same timeslot. A MS may be configured to send all access bursts as low priority bursts (for example, a device that is dedicated to a particular function, such as a sensor device).

Figure 4:
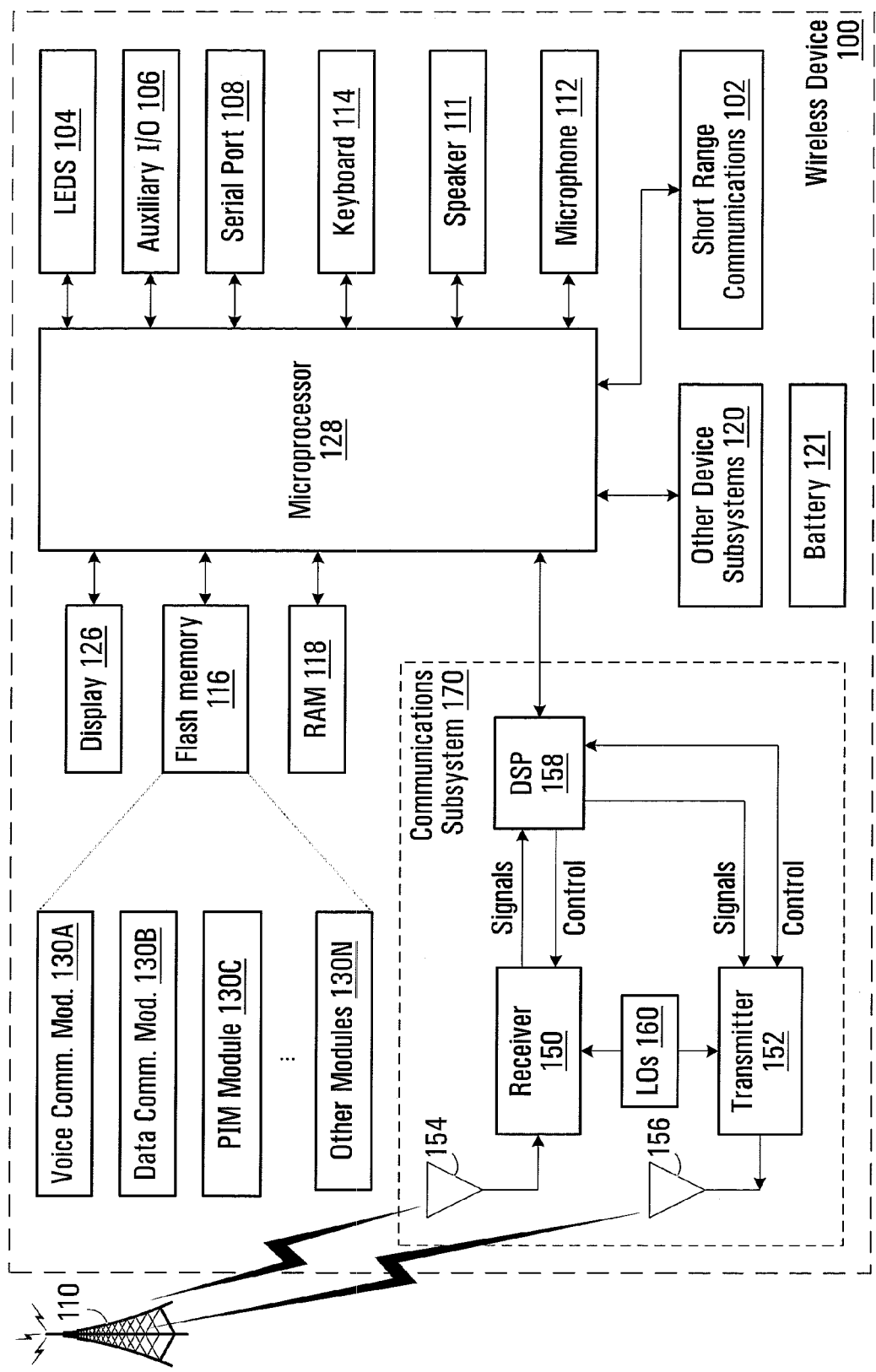
FIG. 4 is a block diagram of an example implementation of a mobile station.

Referring now to FIG. 4, shown is a block diagram of a mobile station, user equipment or wireless device 100 that may, for example, implement any of the methods described in this disclosure. It is to be understood that the wireless device 100 is shown for exemplary purposes only. A processing device (a microprocessor 128) is shown schematically as coupled between a keyboard 114 and a display 126. The microprocessor 128 controls operation of the display 126, as well as overall operation of the wireless device 100, in response to actuation of keys on the keyboard 114 by a user.

The wireless device 100 has a housing that may take on various sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 includes functionality for implementing one or more of the embodiments described above in detail. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™, GERAN or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. As such, the wireless device 100 may support multiple radio access technologies such as GSM, GPRS, EDGE, UTRAN-TDD, UTRAN-FDD, E-UTRAN, CDMA 2000. The communication subsystem 170 may also be designed to operate with an 802.11 Wi-Fi network, and/or an 802.16 WiMAX network. Other types of data and voice networks, both separate and integrated, may also be utilized with the wireless device 100.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

In some implementations, the wireless device 100 is capable of operating in multiple modes such that it can engage in both CS (Circuit-Switched) as well as PS (Packet-Switched) communications, and can transition from one mode of communications to another mode of communications without loss of continuity. Other implementations are possible.

In a particular embodiment, one or more of the above-described methods for transmitting channel access requests to a corresponding base station 110 are implemented by the communications subsystem 170, the microprocessor 128, the RAM 118, and the data communications module 130B, collectively appropriately configured to implement one of the methods described herein.

Figure 5:
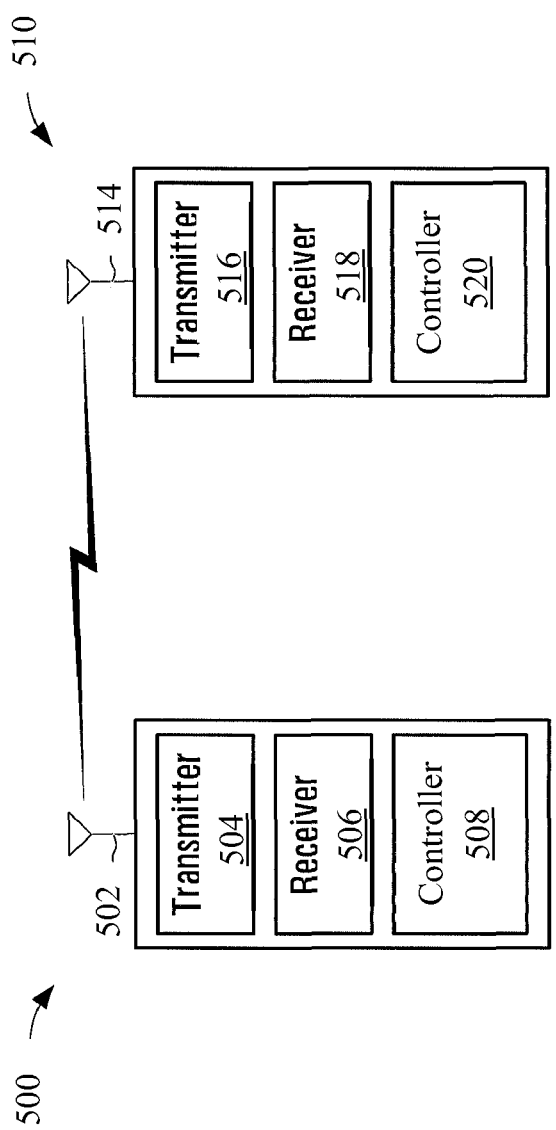
FIG. 5 is a block diagram of an example network comprising a mobile station and a base station.

FIG. 5 is a block diagram of a system within which one or more of the embodiments described above may be implemented. There is a mobile station 500 in wireless communication with a network, as represented by network device or base station 510. As outlined in the context of FIG. 4, the mobile station 500 has at least one antenna 502, a transmitter 502 and a receiver 504 (which may be implemented together as a transceiver) and a controller 508. The network device or base station 510 has at least one antenna 514, a transmitter 516 and a receiver 518 (which may be implemented together as a transceiver) and a controller 520.

The controllers 508, 520 may be implemented in hardware, or a combination of software and hardware, for example software running on a processor.

In the present document, methods and systems for modifying the probability of a successful RACH transmission have been described. For some of the MSs served by a BS, the likelihood of a successful channel access may be increased or decreased. In particular, the methods and systems may be used to provide a fair distribution of the probability for a successful channel access among the MSs served by a particular BS. This is particularly important when dealing with stationary MSs (possibly in combination with non-stationary MSs). The described methods and systems rely on a modification of the UL power levels for RACH transmission, and/or the modification of the retry algorithm for RACH transmissions, and/or the modification of the TA used for RACH transmissions. The modifications may be performed subject to an estimate on the "distance" (from a radio link point of view) from the MS to the BS.

The methods and systems described in the present document may be implemented as software, firmware and/or hardware. Certain components may e.g. be implemented as software running on a digital signal processor or microprocessor. Other components may e.g. be implemented as hardware or as application specific integrated circuits. The signals encountered in the described methods and systems may be stored on media such as random access memory or optical storage media. They may be transferred via networks, such as radio networks, satellite networks or wireless networks. Typical devices making use of the methods and systems described in the present document are mobile stations such as mobile telephones or smartphones. On the network side, the methods and systems may be used in base station equipment.

The invention claimed is:

1. A method, for use in a wireless device, for controlling one or more transmissions between the wireless device and a base station, the one or more transmissions including at least an initial transmission on a radio uplink from the wireless device to the base station, the method comprising:

determining a quality of the radio uplink between the wireless device and the base station, the quality being based on at least one parameter used for a previous transmission on the radio uplink from the wireless device to the base station;

setting a control parameter for controlling the initial transmission between the wireless device and the base station based on the determined quality of the radio uplink; and transmitting the initial transmission, wherein determining the quality comprises:

providing a plurality of previous modulation and coding schemes used for a plurality of previous transmissions on the radio uplink;

determining a plurality of bit-rates associated with the plurality of previous modulation and coding schemes;

applying a filter to the plurality of bit-rates; and determining the quality based on the filtered plurality of bit-rates.

2. A method, for use in a wireless device, for controlling one or more transmissions between the wireless device and a base station, the one or more transmissions including at least an initial transmission on a radio uplink from the wireless device to the base station, the method comprising:

determining a quality of the radio uplink between the wireless device and the base station, the quality being based on at least one parameter used for a previous transmission on the radio uplink from the wireless device to the base station;

setting a control parameter for controlling the initial transmission between the wireless device and the base station based on the determined quality of the radio uplink; and transmitting the initial transmission, wherein determining the quality comprises:

providing a plurality of timing advances used for a plurality of previous transmissions on the radio uplink;

applying a filter to the plurality of timing advances; and determining the quality based on the filtered plurality of timing advances.

3. A method, for use in a wireless device, for controlling one or more transmissions between the wireless device and a base station, the one or more transmissions including at least an initial transmission on a radio uplink from the wireless device to the base station, the method comprising:

determining a quality of the radio uplink between the wireless device and the base station, the quality being based on at least one parameter used for a previous transmission on the radio uplink from the wireless device to the base station;

setting a control parameter for controlling the initial transmission between the wireless device and the base station based on the determined quality of the radio uplink; and transmitting the initial transmission, wherein determining the quality comprises:

providing a receive signal level of a transmission from the base station to the wireless device;

providing a minimum of the receive signal level which is required at the wireless device for accessing the base station; and determining the quality based on a difference of the receive signal level and the minimum of the receive signal level.

4. The method of claim 3, wherein the control parameter comprises a power level; and wherein the method further comprises:

subsequent to not receiving an acknowledgment to one of the one or more transmissions, increasing the power level for a succeeding transmission.

5. The method of claim 4, wherein the control parameter comprises a number of allowed retries.

6. The method of claim 3, wherein setting the control parameter comprises:
   setting a backoff time interval; and
   selecting a backoff time as a random value from the backoff time interval.

7. The method of claim 3, wherein the at least one parameter used for determining the quality of the radio uplink comprises one or more of: a power level, a modulation and coding scheme, or a timing advance.

8. The method of claim 3, wherein determining the quality further comprises:
   providing a maximum of the receive signal level which the wireless device is configured to measure;
   normalizing the difference of the receive signal level and the minimum of the receive signal level by a difference of the maximum of the receive signal level and the minimum of the receive signal level; and
   determining the quality based on the normalized difference of the receive signal level and the minimum of the receive signal level.

9. The method of claim 3, wherein the previous transmission comprises the previous transmission of one or more normal bursts.

10. A method, for use in a wireless device, for controlling one or more transmissions between the wireless device and a base station, the one or more transmissions including at least an initial transmission on a radio uplink from the wireless device to the base station, the method comprising:
   determining a quality of the radio uplink between the wireless device and the base station, the quality being based on at least one parameter used for a previous transmission on the radio uplink from the wireless device to the base station;
   setting a control parameter for controlling the initial transmission between the wireless device and the base station based on the determined quality of the radio uplink; and
   transmitting the initial transmission, wherein determining the quality comprises:
   providing a plurality of previous power levels used for a plurality of previous transmissions on the radio uplink;
   applying a filter to the plurality of previous power levels; and
   determining the quality based on the filtered plurality of previous power levels, wherein the plurality of previous power levels is limited to the power levels used for successful transmissions.

11. The method of claim 10, wherein the filter is one of:
   an averaging filter with or without a forgetting factor;
   a median filter; and
   a maximum filter.

12. The method of claim 10, wherein the plurality of previous power levels correspond to the power levels used for a predetermined number of previously transmitted bursts and/or the power levels used during a predetermined time interval.

13. A wireless device to control one or more transmissions between the wireless device and a base station, the one or more transmissions including at least an initial transmission on a radio uplink from the wireless device to the base station, the device comprising:
   a processor; and
   a memory comprising computer readable instructions which, when executed, cause the processor to at least:
   determine the quality of the radio uplink between the wireless device and the base station, the quality being based on at least one parameter used for a previous transmission on the radio uplink from the wireless device to the base station;
   set a control parameter for controlling the initial transmission between the wireless device and the base station based on the determined quality of the radio uplink; and
   transmit the initial transmission, wherein determining the quality comprises:
   providing a plurality of previous power levels used for a plurality of previous transmissions on the radio uplink;
   applying a filter to the plurality of previous power levels; and
   determining the quality based on the filtered plurality of previous power levels, wherein the plurality of previous power levels is limited to the power levels used for successful transmissions.

14. The wireless device of claim 13, wherein the filter is one of:
   an averaging filter with or without a forgetting factor;
   a median filter; and
   a maximum filter.

15. The wireless device of claim 13, wherein the plurality of previous power levels correspond to the power levels used for a predetermined number of previously transmitted bursts and/or the power levels used during a predetermined time interval.

16. A wireless device to control one or more transmissions between the wireless device and a base station, the one or more transmissions including at least an initial transmission on a radio uplink from the wireless device to the base station, the device comprising:
   a processor; and
   a memory comprising computer readable instructions which, when executed, cause the processor to at least:
   determine the quality of the radio uplink between the wireless device and the base station, the quality being based on at least one parameter used for a previous transmission on the radio uplink from the wireless device to the base station;
   set a control parameter for controlling the initial transmission between the wireless device and the base station based on the determined quality of the radio uplink; and
   transmit the initial transmission, wherein the instructions cause the processor to determine the quality by:
   providing a plurality of previous modulation and coding schemes used for a plurality of previous transmissions on the radio uplink;
   determining a plurality of bit-rates associated with the plurality of previous modulation and coding schemes;
   applying a filter to the plurality of bit-rates; and
   determining the quality based on the filtered plurality of bit-rates.

17. A wireless device to control one or more transmissions between the wireless device and a base station, the one or more transmissions including at least an initial transmission on a radio uplink from the wireless device to the base station, the device comprising:
   a processor; and
   a memory comprising computer readable instructions which, when executed, cause the processor to at least:
   determine the quality of the radio uplink between the wireless device and the base station, the quality being based on at least one parameter used for a previous transmission on the radio uplink from the wireless device to the base station;

set a control parameter for controlling the initial transmission between the wireless device and the base station based on the determined quality of the radio uplink; and transmit the initial transmission, wherein the instructions cause the processor to determine the quality by:

providing a plurality of timing advances used for a plurality of previous transmissions on the radio uplink;

applying a filter to the plurality of timing advances; and determining the quality based on the filtered plurality of timing advances.

18. A wireless device to control one or more transmissions between the wireless device and a base station, the one or more transmissions including at least an initial transmission on a radio uplink from the wireless device to the base station, the device comprising:

a processor; and a memory comprising computer readable instructions which, when executed, cause the processor to at least:

determine a quality of the radio uplink between the wireless device and the base station, the quality being based on at least one parameter used for a previous transmission on the radio uplink from the wireless device to the base station;

set a control parameter for controlling the initial transmission between the wireless device and the base station based on the determined quality of the radio uplink; and transmit the initial transmission, wherein the instructions cause the processor to determine the quality by:

providing a receive signal level of a transmission from the base station to the wireless device;

providing a minimum of the receive signal level which is required at the wireless device for accessing the base station; and determining the quality based on a difference of the receive signal level and the minimum of the receive signal level.

19. The wireless device of claim 18, wherein the control parameter is a power level; and wherein the instructions further cause the processor to:

subsequent to not receiving an acknowledgment to one of the one or more transmissions, increase the power level for a succeeding transmission.

20. The wireless device of claim 19, wherein the control parameter comprises a number of allowed retries.

21. The wireless device of claim 18, wherein setting the control parameter comprises:

setting a backoff time interval; and selecting a backoff time as a random value from the backoff time interval.

22. The wireless device of claim 18, wherein the at least one parameter used for determining the quality of the radio uplink comprises one or more of: a power level, a modulation and coding scheme, or a timing advance.

23. The wireless device of claim 18, wherein determining the quality further comprises:

providing a maximum of the receive signal level which the wireless device is configured to measure;

normalizing the difference of the receive signal level and the minimum of the receive signal level by a difference of the maximum of the receive signal level and the minimum of the receive signal level; and determining the quality based on the normalized difference of the receive signal level and the minimum of the receive signal level.

24. The wireless device of claim 18, wherein the previous transmission comprises the previous transmission of one or more normal bursts.

* * * * *